July 15, 1969   J. C. CRUZ ET AL   3,455,602
DOUBLE ACTING SEAT HINGE
Filed Dec. 8, 1967

INVENTORS
Jose C. Cruz &
BY Rudolph A. Ferrara
E. J. Bishop
ATTORNEY

United States Patent Office 3,455,602
Patented July 15, 1969

3,455,602
DOUBLE ACTING SEAT HINGE
Jose C. Cruz, Utica, and Rudolph A. Ferrara, Warren, Mich., assignors to General Motors Corporation, Detroit, Mich., a corporation of Delaware
Filed Dec. 8, 1967, Ser. No. 689,124
Int. Cl. A47c 3/00; B60n 1/02
U.S. Cl. 297—354                                                     5 Claims

ABSTRACT OF THE DISCLOSURE

A hinge unit for a foldable vehicle seat having a hinge arm that is pivotally connected to the seating cushion at its lower end and to the seat back at its upper end. The hinge unit includes a latching mechanism that locks the seat back to the hinge arm in the normal seating position and maintains such locked condition for a predetermined forward rotation of the seat back about the lower pivotal axis. Thereafter, the latching mechanism simultaneously unlatches the seat back and latches the hinge arm to the seating cushion thereby permitting continued forward rotation of the seat back about the upper pivotal axis to the fully folded position.

---

To achieve more diversified styling shapes and better occupant seating support for the foldable seats of motor vehicles, bolster areas have been proposed for the peripheral edges and the rear portion of the seating cushion. Conventional seating hinges are not readily adaptable for use in such seat constructions inasmuch as the raised bolster areas obstruct forward rotation of the seat back. To some degree, this problem can be avoided by providing long gooseneck hinge arms having a single pivot point substantially forward of the rear of the seating cushion. However, certain additional problems are encountered despite the apparent simplicity of such a hinge construction. Because the hinge arm, when mounted outboard of the seating frame, must not interfere with the seat padding during forward tilting of the seat back, the permissible size of side bolster areas is reduced. Consequently, a hard surface at the seat edge is presented to a person entering the vehicle. Moreover, when such a hinge unit is mounted interior of the vehicle in a concealed location, hinge pockets must be provided in the seat cushion of sufficient size to accommodate the required angular movement of the hinge. Inasmuch as the single hinge requires a relatively large amount of angular movement, the hinge pocket becomes excessively long and, in many instances, must be located in the seating cushion itself, which is undesirable from a styling standpoint.

The hinge unit of the present invention overcomes the above-noted deficiencies of the single pivoting hinge by providing a double acting hinge unit. The hinge arm is pivotally connected at its lower end to the seating cushion and at its upper end to the seat back. In the seat forming position, a latching mechanism locks the seat back to the hinge arm thereby permitting initial forward rotation of the seat back about the lower pivot point. The seat back remains latched to the hinge arm for a predetermined amount of forward rotation about the lower axis at which time the latching mechanism shifts to unlatch the seat back and simultaneously latch the hinge arm to the seating cushion thereby permitting continued forward rotation of the seat back to the fully folded position about the upper pivot axis. By providing this double acting hinge movement, the required rotational movement of the hinge arm need only be sufficient to permit the bottom portion of the seat back to clear the bolster area inasmuch as subsequent rotation to the fully folded position is about a fixed upper pivot point. It will be appreciated that by minimizing the rotation of the hinge arm, interference of the latter with the side seat bolsters is eliminated. In foldable seating assemblies wherein it is desired to have concealed hinge units, the size of the pockets in the seating cushion is similarly reduced.

Accordingly, the objects of the present invention are: to provide an improved hinge unit for a folding vehicle seat wherein rotational movement of the hinge member is minimized; to provide a double acting hinge for a seating unit wherein initial forward rotation of the seat back relative to the seating cushion is about a lower pivot point for a predetermined forward rotation and, subsequently, about an upper pivot point to the folded position thereby reducing the required movement of the hinge arm to move the seat back between the seat forming position and the folded position; to provide a double acting seat hinge for a folded vehicle seat wherein initial forward rotation of the seat back is about a lower pivot point so that the hinge unit pivots relative to the seating cushion and subsequent rotation of the seat back is about an upper pivotal connection between the hinge arm and the seat back; and to provide a hinge unit for a folding vehicle seat wherein the hinge arm, pivotally connected at its upper end to the seat back and at its lower end to the seating cushion, includes a latching mechanism that locks the hinge arm to the seat back in the seat forming position and maintains such a locked condition for a predetermined amount of forward rotation of the seat back after which the mechanism automatically unlatches the seat back from the hinge arm and simultaneously locks the hinge arm to the seating cushion thereby permitting continued rotation of the seat back to the folded position about a fixed upper pivotal axis.

These and other objects will be apparent to one skilled in the art upon reading the following detailed description reference being made to the accompanying drawings in which.

Figure 1:
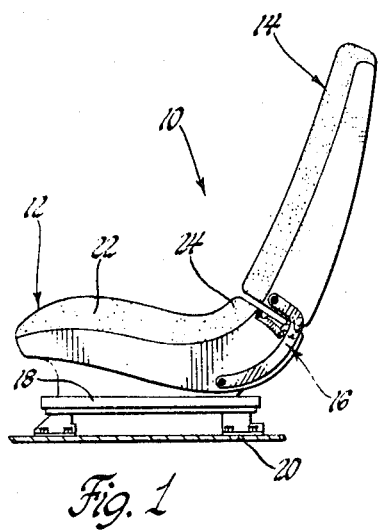
FIGURE 1 is a side elevational view of a folding vehicle seat incorporating the hinge unit of the present invention.

Referring to FIGURE 1, a foldable seating assembly 10 is shown comprising a seating cushion 12, a seat back 14 and a hinge unit 16 made according to the present invention. The seating cushion 12 is conventionally mounted on a selectively longitudinally adjustable mechanism 18 to a motor vehicle floor panel 20, and is provided with contoured side bolster areas 22 and a rear bolster area 24. For convenience of illustration and description, the hinge unit 16 is shown in an exposed outboard position although it will be understood that the same can, and is intended to be, capable of incorporation within the seating assembly at a concealed inboard location. Additionally, while subsequent discussion will make reference to a single hinge unit 16, those skilled in the art will realize and appreciate that a pair of transversely spaced, longitudinally aligned hinge units can be used in the practice of this invention.

Figure 2:
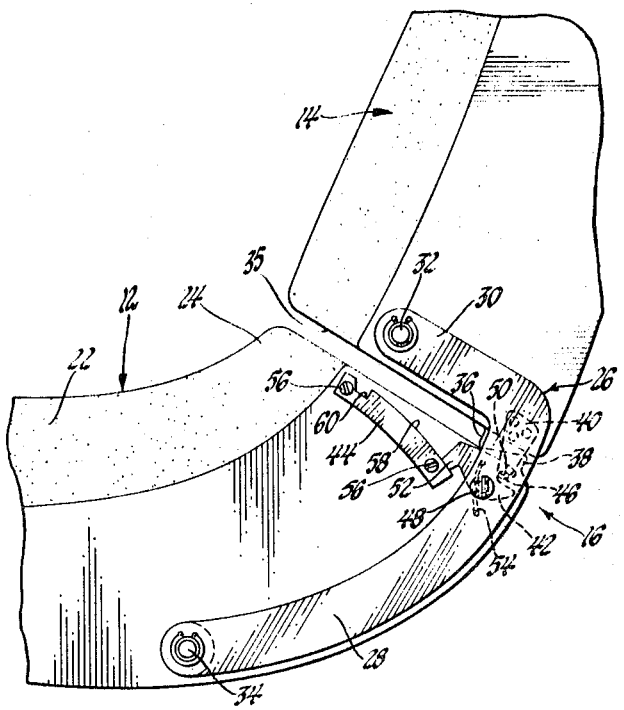
FIGURE 2 is an enlarged fragmentray side elevational view showing the vehicle seat and hinge unit in the seat forming position.

Referring to FIGURE 2, the hinge unit 16 comprises a hinge member 26 having a curved lower arm 28 and an angularly disposed substantially straight upper arm 30. The upper arm 30 is pivotally connected at its forward upper end to the seat back 14 by an upper pivot connection 32 and the lower arm 28 is similarly connected at its lower end to the seating cushion 12 by a lower pivot connection 34. The lower arm 28 should be of a sufficient length so that as the hinge member 26 is rotated forwardly, the arcuate path followed by the bottom surface 35 of the seat back 14 passes above the bolster area 24 without interference. In the illustrated seat forming position of FIGURE 2, rearward rotation of the seat back 14 is prevented by cooperating bumper members 36 and 38 rigidly formed with the rear edges of the seat back 14 and the seating cushion 12, respectively.

Figure 3:
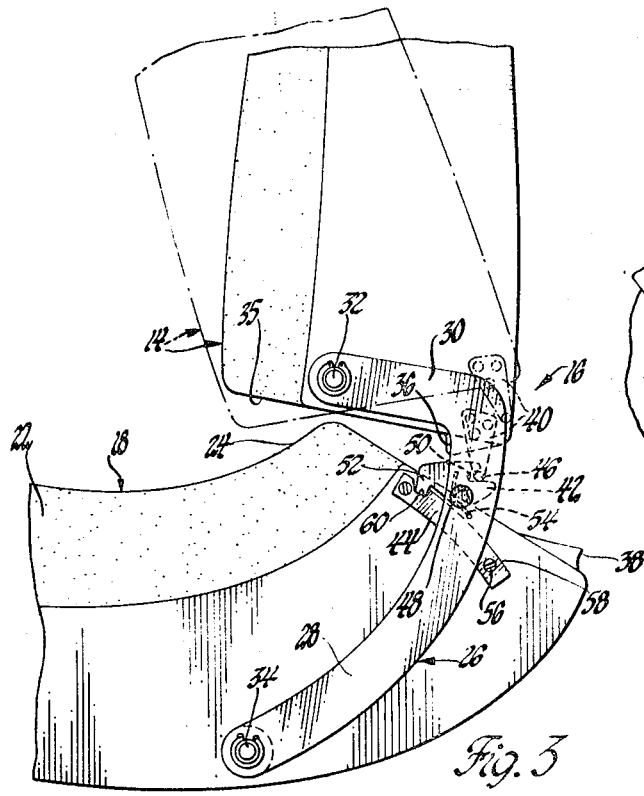
FIGURE 3 is an enlarged fragmentary view showing the latching mechanism for the hinge unit of FIGURE 2.
Figure 4:
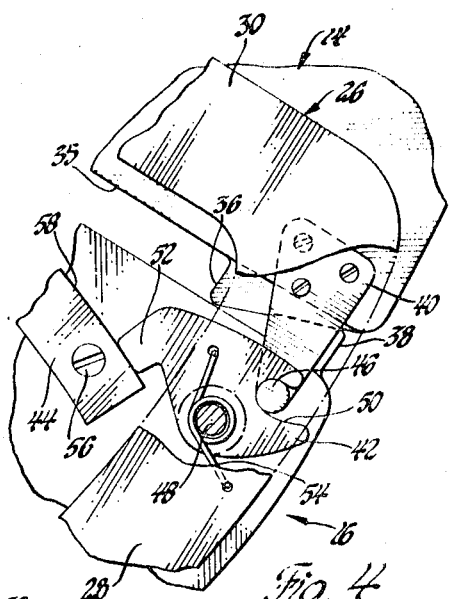
FIGURE 4 is a view similar to FIGURE 2; showing the seat back and hinge unit in the forwardly rotated and folded positions.

As shown most clearly in FIGURE 3, the hinge unit 16 is provided with a latching mechanism comprising a striker 40, a rotatable latching member 42 and a cam guide 44. The upper end of the striker 40 is fixedly connected to the seat back 14. A transversely extending striker shaft 46 is formed at the lower end of the striker 40. The rotatable latching member 42 is pivotally connected to the hinge member 26 at pivot connection 48 and includes a rearwardly opening keeper slot 50 adapted to engage striker shaft 46 and a pawl 52 that is adapted to engage cam guide 44 in the seat forming position. The rotatable latching member 42 is spring biased in a counter-clockwise direction by means of a torsion spring 54. The cam guide 44 is secured to the seating cushion 12 by any suitable fastener means, such as screws 56, and is provided with an arcuate upper cam surface 58 having the lower pivot connection 34 as its origin so that, as the hinge arm is rotated forwardly about pivot connection 34, the pawl 52 is in continuous sliding engagement with the cam surface 58 until biased into engagement with an upwardly opening latching notch 60, formed at the forward portion of the cam guide 44.

It will be appreciated that the seat back 14 is locked to the hinge member 26 by the latching mechanism when the seating assembly 10 is in the seat forming position thereby preventing rotation of the seat back 14 about pivot connection 32 while permitting initial forward rotation of the same about pivot connection 34. Referring again to FIGURE 3, when the seat back 14 and the connected hinge member 26 are rotated forwardly to the position illustrated by the solid lines, the pawl 52 is biased by means of the torsion spring 54 into engagement with the latching notch 60. As a consequence, it will be seen that the keeper slot 50 is disengaged from the striker shaft 46 thereby unlatching the seat back 14 and permitting continued forward rotation of the latter about pivot connection 32. At the same time, it will be noted that the engagement of pawl 52 in the latching notch 60 locks the hinge member 26 to the seating cushion 12 thereby preventing rotation of the hinge member 26 about the lower pivot connection 34.

To return the seating assembly 10 to the normal seat forming position, the seat back 14 is rotated rearwardly about pivot connection 32 from the phantom line position to the solid line position. At this point, the striker shaft 46 engages the lower surface of the keeper slot 50 thereby rotating the latching member 42 clockwise so as to disengage the pawl 52 from the latching notch 60 and simultaneously lock the striker shaft 46 within the keeper slot 50. As the seat back 14 is moved rearwardly from the FIGURE 3 position to the seat forming position shown in FIGURE 2, the pawl 52 slides along the cam surface 58 to maintain the locked relationship between the hinge member 26 and the seat back 14 so that the same pivot as a fixed unit about pivot connection 34.

Thus, it will be seen that the present invention provides a dual acting hinge unit wherein initial rotation is about a fixed lower axis and subsequent rotation is about a fixed upper axis. With proper sizing of the individual components, a hinge unit can be readily designed that will permit movement of a seat back from a seat forming position to a folded positon with a minimal amount of rotational movement by the hinge arm. For exposed hinge assemblies, this minimal movement of the hinge arm does not interfere with the side bolster area 22. In seating assemblies using concealed hinge constructions, the hinge pockets are minimal in size and can be located in an unexposed portion of the seating cushion 12.

What is claimed is:

1. A seat assembly having a seat back supported by a hinge member and movable relative to a seat cushion between a seat forming position and a forwardly folded position, said seat cushion having a rear bolster area and said hinge member pivotally connected to the seat cushion about a first axis and to the seat back about a second axis; a hinge unit controlling movement of the seat back about said first and second axes, said hinge unit comprising: a locking member connected to the hinge member and movable between a first position and a second position, said locking member having a first portion adapted to engage the seat back to establish a locked condition between the latter and the hinge member when said locking member is in said first position, said locking member having a second portion adapted to engage the seat cushion when said locking member is in said second position to fixedly connect said hinge member to said seat cushion; means cooperating with the locking member and establishing said locked condition when the seat assembly is in the seat forming position and maintaining such locked condition for a forward rotation of the hinge member about the second axis to a partially folded position wherein said seat back overlies said rear bolster area; and means operatively associated with the locking member for automatically moving the latter from said first position to said second position at said partially folded position.

2. A seat assembly having a seat back supported by a hinge member and movable relative to a seat cushion between a seat forming position and a forwardly folded position, said seat cushion having a rear bolster area and said hinge member pivotally connected to the seat cushion about a first axis and to the seat back about a second axis; a hinge unit controlling movement of the seat back about said first and second axes, said hinge unit comprising: a locking member pivotally connected to the hinge member rotatable between a first position and a second position, said locking member having a first portion adapted to engage the seat back to establish a locked condition between the latter and the hinge member when said locking member is in said first position; said locking member having a second portion adapted to engage the seat cushion to maintain a fixed relationship between said hinge member and said seat cushion when said locking member is in said second position; a cam member having a cam surface fixedly connected to the seat cushion, said cam surface cooperating with the locking member and establishing said locked condition when the seat assembly is in the seat forming position and maintaining such locked condition for a forward rotation of the hinge member about said second axis to a partially folded position wherein said seat back overlies said rear bolster area; and spring means operatively associated with the locking member for automatically moving the latter from said first position to said second position at said partially folded position and maintaining said fixed relationship between said hinge member and said seat cushion as the seat back is pivoted forwardly from said partially folded position to said forwardly folded position about said first axis.

3. A seat assembly having a seat back supported by a hinge member and movable relative to a seat cushion between a seat forming position and a forwardly folded position, said seat cushion having a rear bolster area and said hinge member pivotally connected to the seat cushion about a first axis and to the seat back about a second axis; a hinge unit controlling movement of the seat back about said first and second axes, said hinge unit comprising: a locking member including a keeper slot and a pawl connected to the hinge member and movable between a first position and a second position; a striker member fixedly connected to the seat back, said keeper slot adapted to engage the striker member to establish a locked condition between the seat back and the hinge member when said locking member is in said first position; a cam member including a cam surface and a latching notch fixedly connected to the seat cushion, said latching notch adapted to receive and retain the pawl when said locking member is in said second position to establish a fixed relationship between said hinge member and said seat cushions, said cam surface cooperating with the pawl and establishing said locked condition when the seat assembly is in the seat forming position and maintaining such locked condition for a forward rotation of the hinge member about said second axis to a partially folded position wherein said seat back overlies said rear bolster area; and spring means operatively associated with the locking member for automatically moving the latter from said first position to said second position at said partially folded position; said pawl and said latching notch cooperating to maintain said fixed relationship between said hinge member and said seat cushion as said seat back is pivoted forwardly from said partially folded position to said forwardly folded position about said first axis.

4. A hinge unit for a seat assembly wherein a seat back is movable relative to a seat cushion between a seat forming position and a forwardly folded position, comprising: a hinge member pivotally connected to the seat cushion about a first pivot axis and pivotally connected to the seat back about a second pivot axis; a latching mechanism controlling movement of the seat back relative to the seat cushion about said first and second pivot axis, said latching mechnism locking the seat back to the hinge member so as to preclude rotation of said seat back about said second pivot axis when the seat back is in the seat forming position and maintaining such fixed condition for a predetermined forward rotational movement of the seat back about the first pivot axis, said latching mechanism including means operative during forward rotational movement of the seat back for automatically unlatching said seat back from the seat hinge and simultaneously locking said hinge member to the seat cushion after said predetermined forward rotational movement of the seat back to permit rotational movement of the latter about the second pivot axis.

5. A hinge unit for a seat assembly wherein a seat back is movable relative to a seat cushion between a seat forming position and a forwardly folded position, comprising: a hinge member pivotally connected to the seat cushion about a first pivot axis and pivotally connected to the seat back about a second pivot axis; locking means preventing rotation of the seat back relative to the hinge member about the second pivot axis in the seat forming position and maintaining such condition for a predetermined forward rotational movement of the seat back about the first pivot axis, and means operative during forward rotational movement of the seat back and carried by the seat cushion for automatically releasing said locking means after said predetermined forward rotational movement of the seat back about the first pivot axis and simultaneously preventing rotation of said hinge member about the first pivot axis to thereby cause the seat back to be pivoted forwardly about the second pivot axis.

References Cited

UNITED STATES PATENTS

| 2,579,305 | 12/1951 | Cushman | 297—361 |
| 2,873,794 | 2/1959 | Leslie, et al. | 297—379 |
| 3,123,401 | 3/1964 | Komenda | 297—379 |
| 3,185,525 | 5/1965 | Welsh | 297—367 |
| 3,271,071 | 9/1966 | Tabor | 297—375 |
| 3,342,527 | 9/1967 | Bencene | 297—379 |

BOBBY R. GAY, Primary Examiner

GLENN O. FINCH, Assistant Examiner

U.S. Cl. X.R.

297—367, 379